(12) United States Patent  (10) Patent No.: US 6,304,377 B1
Murr  (45) Date of Patent: Oct. 16, 2001

(54) WALL AND/OR PROJECTION BOARD

(75) Inventor: Andreas Murr, Wasserburg (DE)

(73) Assignee: Werndl BüroMöbel AG, Rosenheim (DE)

( * ) Notice: Subject to any disclaimer, the term of this patent is extended or adjusted under 35 U.S.C. 154(b) by 0 days.

(21) Appl. No.: 09/419,064

(22) Filed: Oct. 15, 1999

(30) Foreign Application Priority Data

Oct. 16, 1998 (DE) ................................................ 198 47 846

(51) Int. Cl.$^7$ .............................. G03B 21/56; A47G 1/24; E06B 9/00
(52) U.S. Cl. .......................... 359/443; 359/446; 359/450; 248/479; 248/480; 248/486; 160/127
(58) Field of Search ..................................... 359/443, 446, 359/450; 160/368.1, 127; 248/479, 480, 486

(56) References Cited

U.S. PATENT DOCUMENTS 2,894,576 * 7/1959 Williams ............................... 160/220
4,226,037 * 10/1980 Rodriguez ............................. 40/733

FOREIGN PATENT DOCUMENTS

685913 A5   11/1995  (CH) .
4437 113 A1  4/1996  (DE) .
1.272.106    4/1960  (FR) .

* cited by examiner

Primary Examiner—Christopher E. Mahoney
Assistant Examiner—Magda Cruz
(74) Attorney, Agent, or Firm—Nixon & Vanderhye

(57) ABSTRACT

A wall and/or projection board which can be used on both sides and can be engaged in a horizontal wall rail. At least a first engagement element is connected to the wall-board element via a vertical pivot-spindle connection. The vertical pivot-spindle connection is designed such that, following disengagement of a second engagement element, the wall-board element can be pivoted through 180° about the vertical pivot-spindle connection retained by the first engagement element and can be engaged in the wall rail on the other side in relation to the first engagement element.

8 Claims, 4 Drawing Sheets

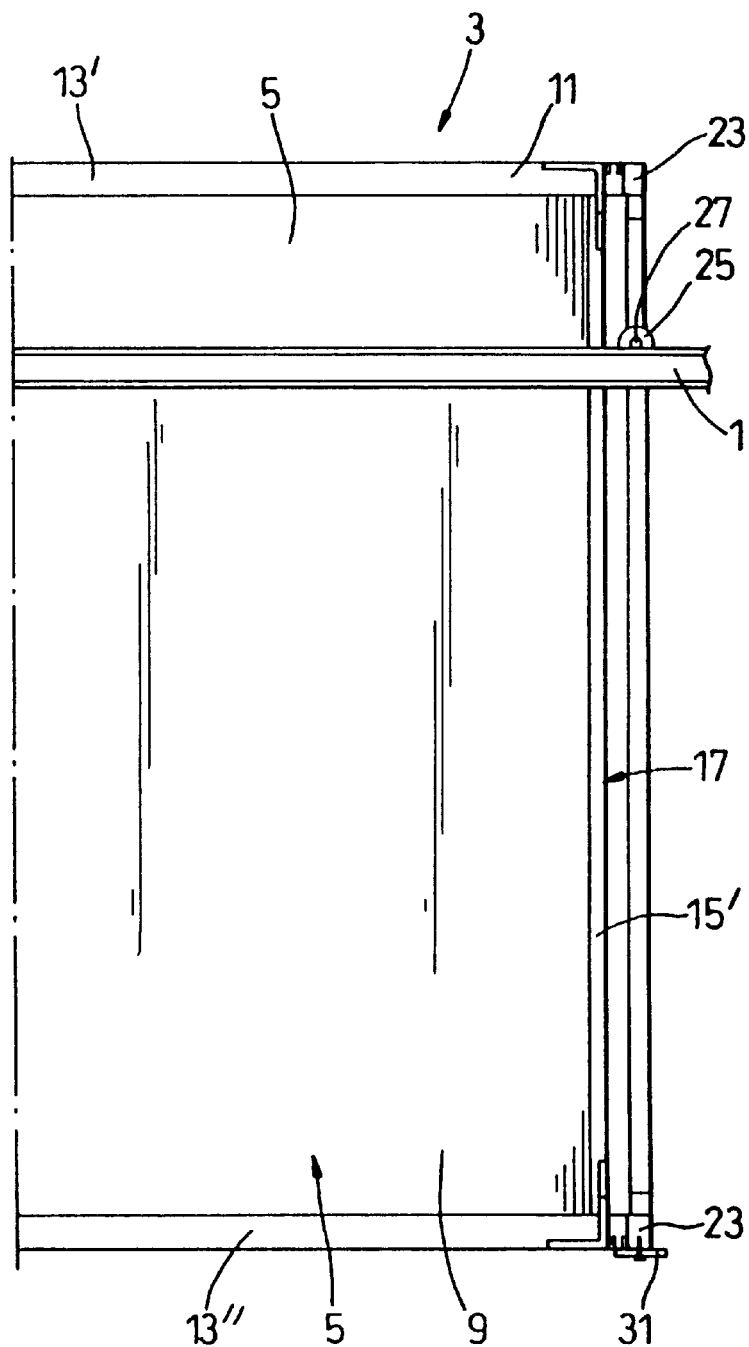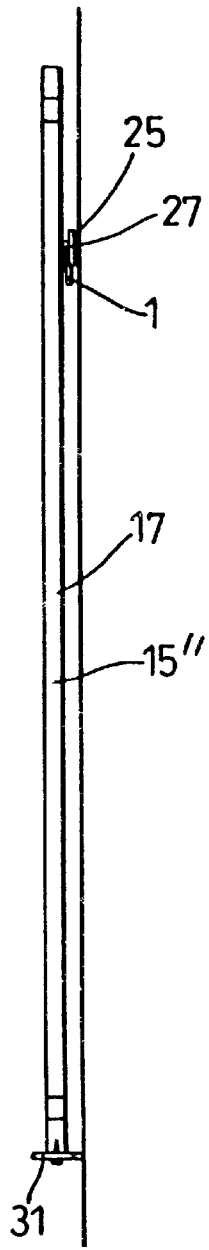
*Fig. 3*  *Fig. 4*

WALL AND/OR PROJECTION BOARD

The invention relates to a wall and/or projection board according to the preamble of claim 1.

So-called flip-chart wall boards, projection walls for the professional presentation of slides or films or the use of overhead projectors or in the form of white boards which are provided with grid elements and on which it is possible to write using felt-tip pens, and/or in the form of pinboards or so-called magnetic boards, are very popular, in particular for professional use. Apart from flip charts, which are often designed as separate stand elements, use is otherwise made of wall and/or projection boards which can be engaged in a horizontal rail fastened on the wall. The engagement can take place by means of hooks or, for example, also with the use of rollers, in order for it to be possible for the elements of the wall and/or projection boards to be displaced more easily.

Different wall or projection boards are required for the different application purposes. This is because the type of surface for wall boards upon which it is possible to write usually differs from that for so-called projection walls which are required for the presentation of slides or films or the use of overhead projectors. Instead of using two different wall boards for the different application purposes, it is thus also known, in principle, to use a wall-board element which has differently configured front and rear sides for the different application purposes. However, this requires such a wall-board element, depending on the application purpose, to be disengaged from the wall rail, rotated through 180° and then engaged again. Since this is laborious, such wall-board elements which can be used on both sides have not gained widespread acceptance.

The object of the present invention is thus to provide an improved wall and/or projection board which is better suited to the different application purposes.

The object is achieved according to the invention by the features specified in claim 1. Advantageous configurations of the invention are specified in the subclaims.

The wall and/or projection board according to the invention usually has different types of surfaces on the front and rear sides, with the result that the wall panel can preferably be used for two different application purposes. If required, however, it is also possible for the front and rear sides to be of the same type, but such that both surfaces of the resulting wall and/or projection board can be used.

The solution according to the invention is distinguished, in particular, in that such a wall and/or projection board can easily be turned in a single movement, i.e. just with one hand.

The invention provides at least one engagement element which is engaged in an engagement rail, is arranged, for example, on the left-hand vertical border region of the wall-board element and is connected to the latter via a vertical pivot connection. By gripping the wall-board element, for example, on the opposite side, it is possible for the wall board to be disengaged from the wall rail there, for example by straightforward lifting, and for the wall panel then to be pivoted through 180° about the engagement element which remains engaged on the left-hand side in the horizontal engagement rail, until the originally right-hand side of the wall panel then comes to rest on the left-hand side in front of the wall and, by virtue of the 180°-rotation, the initially rear, concealed top side of the wall panel is now oriented toward the front.

If, on the two opposite sides, the engagement elements respectively provided there are connected to the wall-board element via a vertical pivot connection, then such a wall-board element may be rotated, as desired, through 180° in each case from left to right or from right to left in order to turn the board element. If, for example, a top side is provided with a special reflective coating, then this side may preferably be used for the presentation of slides or films or the use of an overhead projector, whereas the other, opposite top side for example may be configured as a top side upon which it is possible to write. One or both surfaces may also be configured in this case, with the use of metal elements, as magnetic boards.

A particularly preferred embodiment is achieved when the respectively vertical pivot spindle is formed by a vertical rod which is located both on the left and right of the actual wall-board element and on which the respective engagement element is fastened preferably in the top half of this retaining rod. This means that all that is required for turning the board is to grip the relevant vertically running rod and to disengage the associated engagement element from the horizontal rail by lifting, in order then to rotate the board through 180° in each case about the opposite vertical rod, which remains engaged in the engagement rail and forms a vertical pivot spindle. In other words, the respectively opposite retaining rod remains unpivoted during the pivoting operation, with the result that the actual wall-board element is pivoted relative to the vertical rod which does not rotate along with it in each case. It is also the case, however, that the vertical rod gripped by the hand maintains the same aligned position in relation to the wall during the pivoting operation, with the result that throughout the entire pivoting operation, from the disengagement of the associated engagement element until the latter is engaged again in the position in which the wall-board element has been rotated through 180°, said engagement element does not rotate relative to the pivoting operation of the board, in other words the engagement element always remains aligned in relation to the wall during this pivoting operation. The renewed engagement following completion of the pivoting of the wall-board element can thus be carried out without difficulty.

The engagement elements, which preferably comprise rollers, may be provided in the top region of the wall-board element, i.e. even above the top edge of the actual wall-board element, but may also be provided at a lower level. The rollers are preferably provided in a region between a central horizontal plane and the top edge region of the wall-board element. In particular in this case, the spacing between the vertical retaining rods, which form the pivot spindles relative to the actual wall-board element, and the border of the actual wall-board element is dimensioned to be of such a magnitude that, during the turning operation, the associated engagement element, preferably in the form of the abovementioned roller, can be pivoted through said gap.

The invention is explained in detail hereinbelow with reference to drawings, in which, specifically:

FIG. 3 shows an illustration from the rear of a detail of the wall and/or projection board represented in FIG. 1, with the horizontally running wall rail being represented but the wall being omitted;

FIG. 4 shows a side illustration of the wall board from FIG. 1; and

Figure 1:
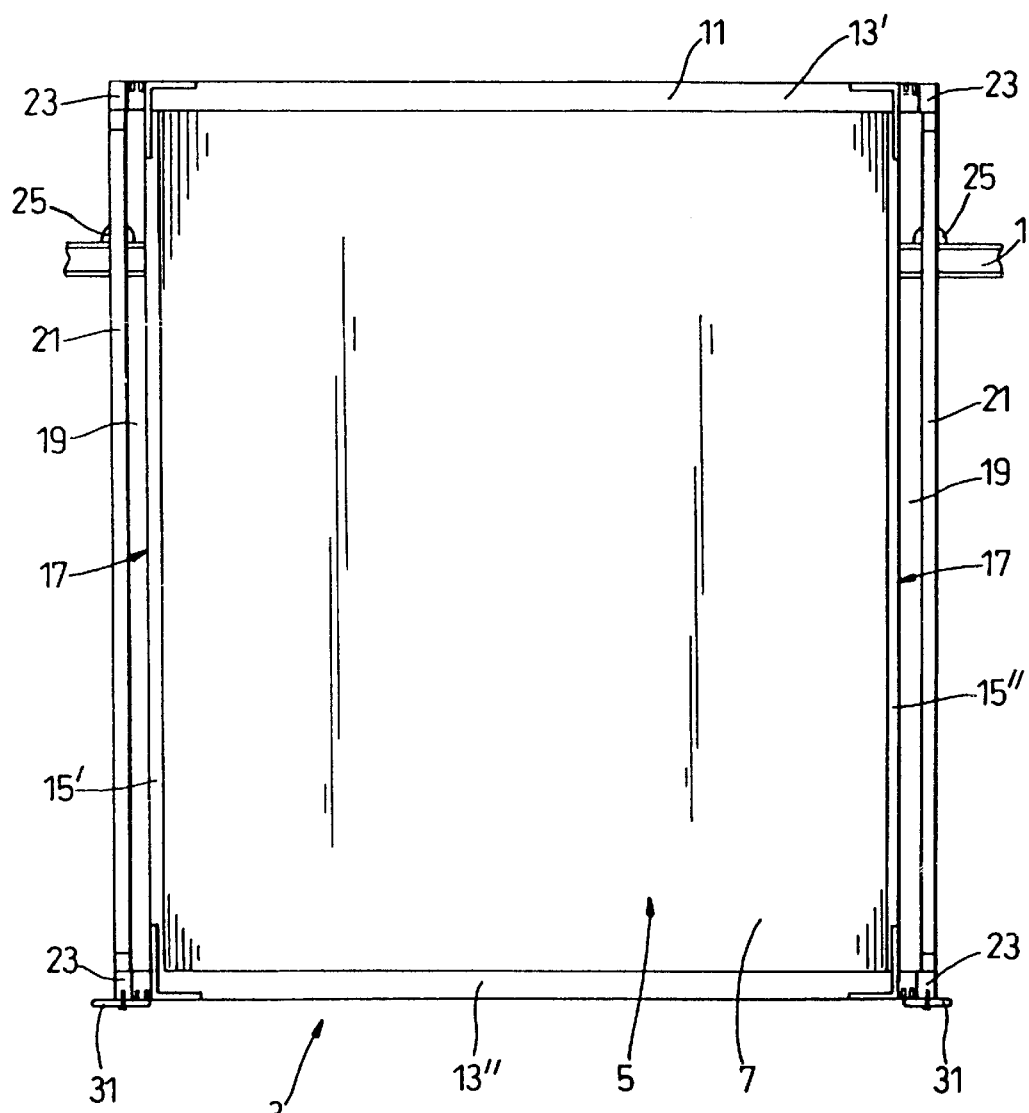
FIG. 1 shows a schematic front-side illustration of an exemplary embodiment of the wall and/or projection board according to the invention which can be used on both sides and can be engaged in a horizontally running wall rail.
Figure 2:
FIG. 2 shows a horizontal cross section through the exemplary embodiment illustrated in FIG. 1.

The figures illustrate a wall and/or projection board 3 which can be used on both sides, can be engaged in a horizontally running wall rail 1 and comprises an actual wall-board element 5 with a first side 7 (FIG. 1) and a second side 9 (FIG. 3). The two sides 7 and 9 may be configured to be the same, but are usually different, it being possible, for example, for the first side 7 to be configured as a side upon which it is possible to write and for the second side 9 to be configured, for example, as a projection wall, and preferably comprising a special reflective covering for this purpose. The wall-board element 5 may also be produced using ferromagnetic materials, with the result that magnets adhere to it, for example, at least on one side.

The wall-board element 5 comprises a frame 11 with top and bottom profiles 13', 13" and left and right vertically running profiles 15', 15".

In the exemplary embodiment shown, the top and bottom profiles 13', 13" project beyond the respectively left-hand and right-hand borders 17 of those borders of the wall-board element 5 which are formed by the vertical profiles 15'and 15", in each case one retaining rod 21 adjoining on the outside at a spacing 19 from the left-hand and right-hand borders 17.

Said retaining rod 21 is connected to the actual wall-board element 5 directly or indirectly via a pivot connection 23 located at the top and bottom, i.e., in the exemplary embodiment shown, the retaining rod is connected to the top and bottom profiles 13', 13", which bear the wall-board element 5.

It can also be seen from the figures that in the top half of the wall-board element 5, when seen from the front, an engagement element 25 in the form of a roller is fastened rotatably in each case directly behind the associated retaining and/or actuating rod 21, each roller 25 being connected to the associated retaining rod 21 via a non-tiltable horizontal spindle 27, about which the roller 25 rotates.

A wall board formed in this way may be displaced for example, as desired, to the left and right along the wall rail 1, which is fastened at an appropriate height on a wall 29.

Since in this hanging position, on account of the center of gravity of the wall and/or projection board 3, which is located in front of the wall rail 1, the board executes a certain tilting movement in which the bottom part of the wall-board element 5 tilts toward the wall 29, circular spacer elements 31 are preferably provided in the bottom or side region of the wall-board element 5, in the bottom region of the retaining rod 21 in the exemplary embodiment shown, said spacer elements supporting the wall board on the associated wall 29. The disk-like spacer elements 31 shown are screwed on in extension of the ends of the retaining rods 21 and have such an external diameter that the wall-board element 5 assumes the desired position, usually coming to rest, as far as possible, in a precisely vertical manner. However, it would also be possible for the spacer elements 31 to be of a non-circular design, with the result that rotation of the spacer elements makes it possible for the spacing between the underside of the wall-board element 5 and the wall to be adjusted differently, as a result of which it is possible to adjust, for example, a desired slight angle of inclination of the wall-board element 5 in relation to the vertical wall 29, which is possibly advantageous if the wall-board element is to be used as a projection wall.

Details of the pivoting of the board are given hereinbelow.

In the exemplary embodiments shown in FIGS. 1 to 4, for example the first side 7 of the wall board 5 is oriented toward the front, that is to say it forms the front side, whereas the second side 9, which can only be seen in the rear view in FIG. 3, is oriented toward the wall. If, then, the board is to be turned, then all that is necessary, for example, is for the board to be gripped on one side and turned through 180°. For this purpose, the retaining and/or actuating rod 21 which is on the right-hand side in FIG. 1 is gripped, for example, by the hand and the wall and/or projection board 3 is lifted until the engagement element 25 which is on the right-hand side in FIG. 1, i.e. the roller provided there, is released from the running channel or running rail 1, which is provided with a sunken or groove-like engagement section. In this case, the board still assumes the position shown in FIGS. 1 to 5.

Figure 6:
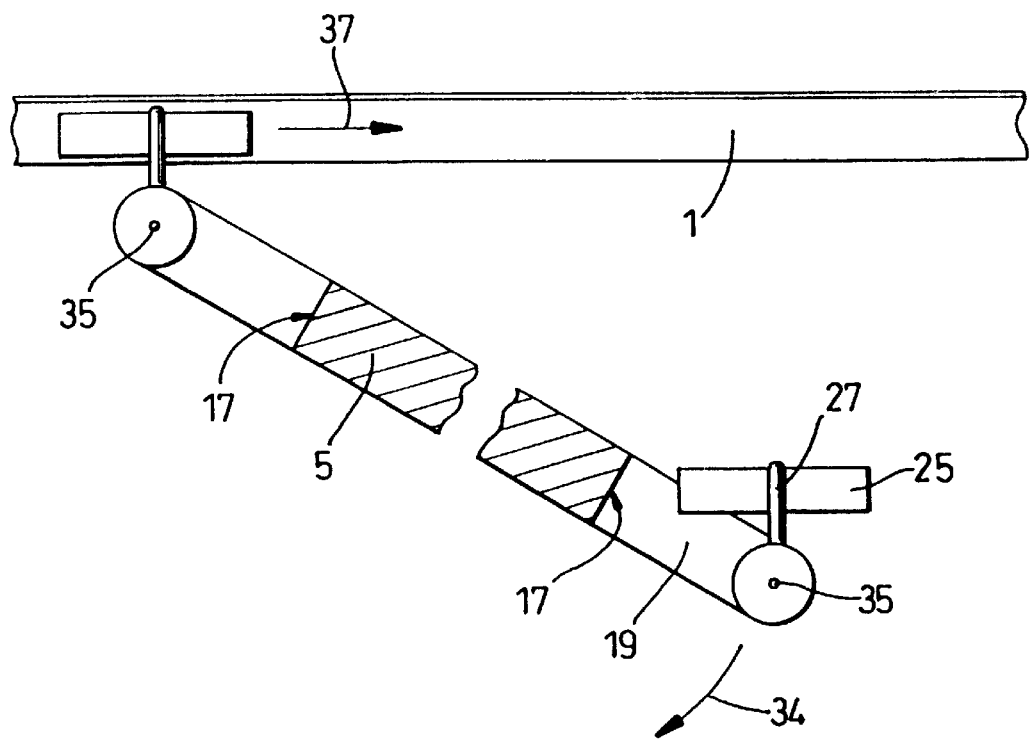

The gripped retaining and actuating rod 21 is then pivoted away from the wall in accordance with arrow 34, the entire wall and/or projection board 3 executing a pivoting movement about the opposite, i.e. left-hand, retaining rod 21, said pivoting movement being correspondingly represented schematically in a vertical plan view, and in detail form, in FIG. 6. In this case, the left-hand retaining rod 21 remains at rest, without pivoting, the associated left-hand engagement element 25, i.e. the associated roller, continuing to rest in the running rail 1 and thus absorbing the remaining weight of the wall and/or projection board 3.

Figure 5:
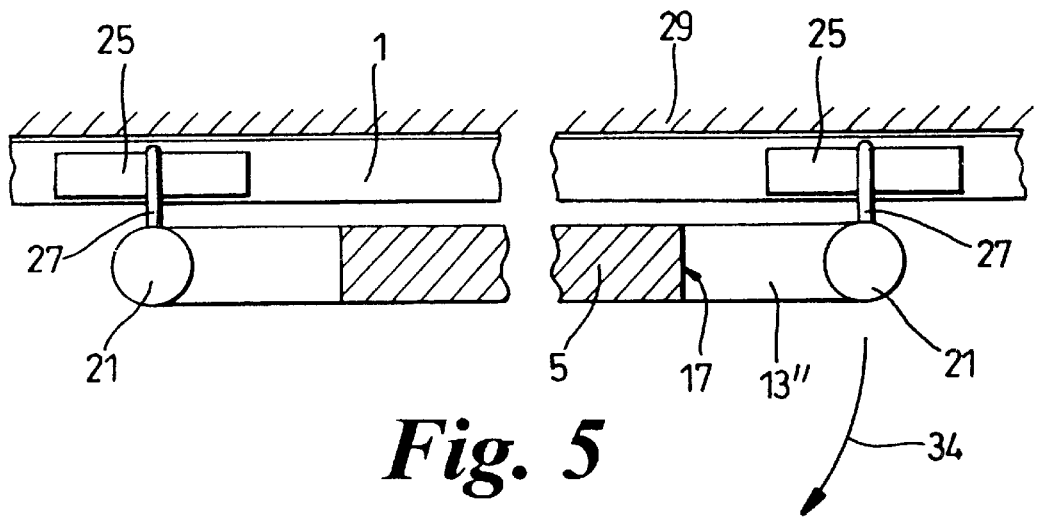
FIGS. 5 to 7 show various horizontal-section illustrations, represented schematically and in detail form, during a turning operation of the wall panel represented in FIG. 1.
Figure 7:
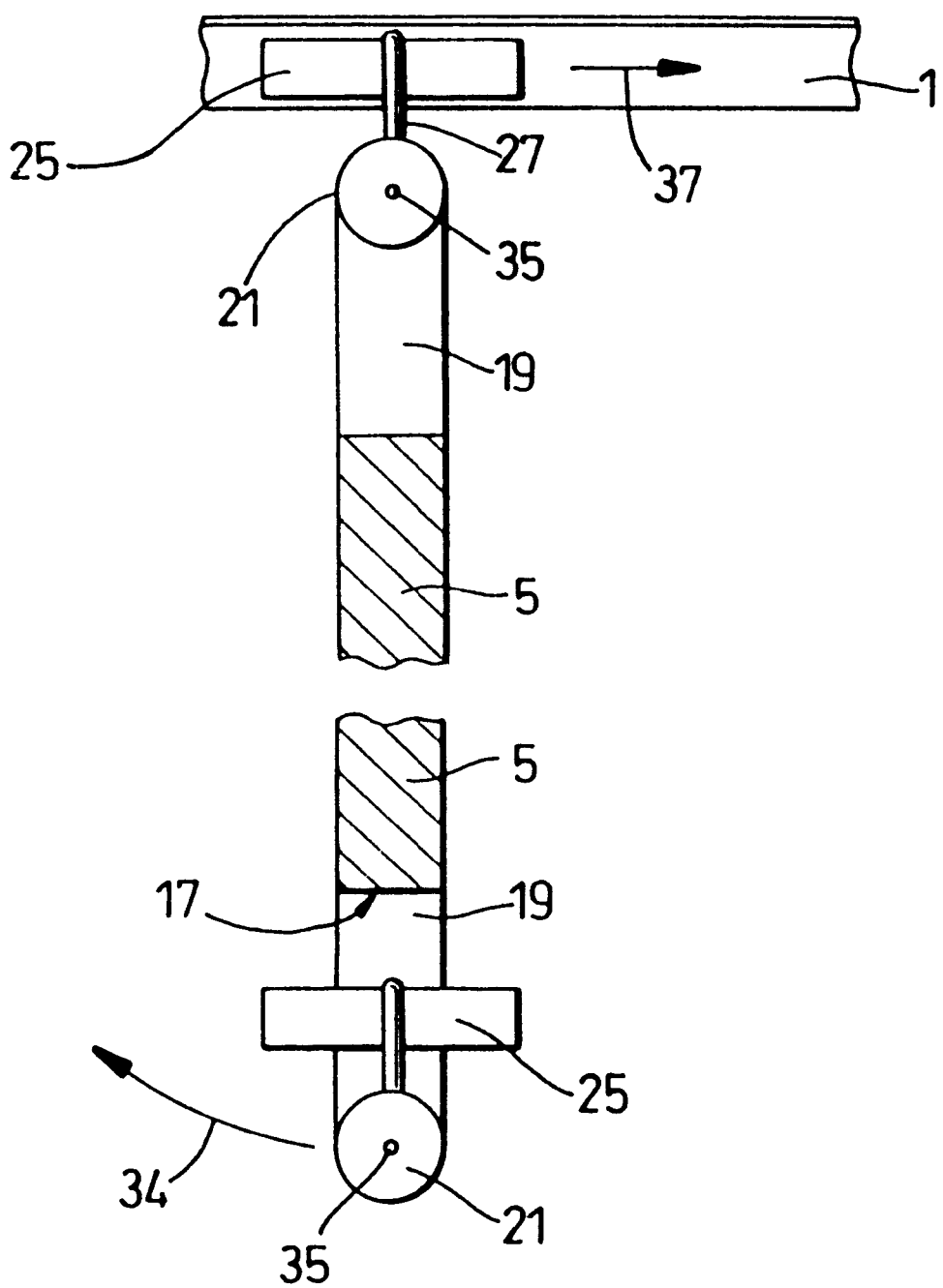

As can also be seen even from FIG. 6, however, it is also the case, with the pivoting movement of the wall-board element 5 represented in FIGS. 5 to 7, that the gripped, right-hand retaining rod 21 is not pivoted along with the wall-board element since the person who is carrying out the pivoting operation always stands in front of the board, looking at the board or wall 29, or moves in accordance with the arrow 34 and the right-hand retaining rod 21, gripped by the hand, thus does not execute any rotary movement. The associated engagement element 25, which in the exemplary embodiment shown is in the form of a roller, thus always remains aligned in the direction of the associated wall.

During the continuing pivoting movement, the actual wall-board element 5 executes a pivoting movement through 180°, it being the case that, as has been mentioned, the right-hand retaining rod 21 with the associated roller is indeed pivoted on a semicircular path about the pivot spindle 35 formed by the left-hand retaining rod 21, but does not execute any rotary movement about its own central spindle, which runs through the right-hand retaining rod 21. As a result, the engagement element 25, which is in the form of a roller, moves through the space between the associated retaining and actuating rod 21 and the right-hand wall 17 of the board element 5, as is indicated in FIG. 6 and can be seen clearly in FIG. 7.

With continuing pivoting movement, the retaining rod, with the associated roller 25, which is still on the right-hand side in FIG. 1, then reaches a position to the left of the opposite actuating rod, it being the case that the engagement element 25 also always remain in alignment with the wall 29 during the rest of the pivoting movement and, at the end of the pivoting movement, all that is then required is for the engagement element 25, which is in the form of the roller, to be engaged in the wall rail 1 again.

During the pivoting operation, it is possible for the opposite roller 25, which remains in the wall rail 1, to execute for example a translatory displacement movement in accordance with the arrow 37, which movement is to be executed along the wall rail 1, with the result that, upon engagement of the pivoted roller 25, the turned wall-board element 5 comes to rest again against the same, or virtually the same, starting location, at which the previously upturned wall board was positioned on the wall rail 1 and thus on the wall itself.

The turning operation explained above has thus accomplished a 180°-turn of the actual wall-board element 5 between the two opposite retaining rods 21, although the retaining rods themselves, along with the associated engagement elements 25, have not followed this relative rotary movement.

Since the wall board is of symmetrical construction, it is possible for the turning operation to be carried out optionally a number of times about the pivot spindle 35 formed by the respective retaining rod 21.

It should be noted that, in principle, it would only be sufficient, in order to allow a turning movement, if a corresponding pivot spindle were provided just on one side of the wall-board element. In this case, it would only be possible for a pivoting movement, and thus a turning operation of the wall-board element 5, to take place about this one pivot spindle 35.

Finally, it should also be noted that the wall rail 1 and thus the engagement elements, even in the form of the rollers, may be provided at a different height relative to the wall element 5, for example also at the top end of the retaining rod 1. The only important factor here is for the engagement element with the associated pivot spindle 35 to remain unpivoted, in the starting position, when the rest of the wall element is pivoted about said pivot spindle 35.

In contrast to the exemplary embodiment shown, it is possible, for example, for the actuating rods provided on both sides of the actual wall element 5 to be provided directly alongside the border 7 of the wall-board element 5, in particular when the actuating rods are extended beyond the top border, the top termination profile 13', with the result that the engagement elements 25 are located above the top horizontal termination profile 13' or above the top edge of the wall-board element 5. It is then also possible, for example, for a forwardly projecting handle to be formed on the actuating rods 21, in order for it to be possible to grip the actuating rod 21 easily. During the pivoting movement from one side to the other, in accordance with FIGS. 5 to 7, the engagement element—irrespective of the specific design of the engagement element 25, that is to say even in the case of a roller—can easily be pivoted above the top edge or the top termination profile 13' beyond the actual wall element 5, that is to say not through a space 19 provided between the actuating rod 21 and the right-hand border 17, as is shown with reference to FIGS. 5 and 6.

Finally, it should also be noted that it is also possible for the actual engagement element 25 to be located in a concealed manner behind the actual wall-board element, to be precise if the vertical pivot spindle 35 is located at a sufficient spacing in front of the wall 29 for that border region of the wall board 5 which projects laterally beyond the vertical pivot spindle 35 to be able to pivot without colliding with the engagement element.

If, in contrast to the exemplary embodiment shown, a pivot spindle 35 or a pivot-articulation arrangement 23 should only be formed on one side of the wall-board element 5, then it would be favorable if the engagement element located opposite it were of two-sided design, that is to say if it were to allow engagement in the direction of the rear wall but also in the forward direction. This is because, once the board has been turned about the left pivot spindle, it would then be possible, following the pivoting operation, for the initially forwardly oriented engagement element, if it is located adjacent to the wall, to be engaged in the engagement rail again. An embodiment according to the exemplary embodiments explained, in which a pivoting movement can be carried out alternately about each of the two actuating rods 21, is preferred.

What is claimed is:

1. A wall or projection board usable on both sides and engageable on a horizontal wall rail, comprising:
   a board member;
   a first engagement element disposed adjacent one side edge of the board member and a second engagement element disposed adjacent an opposite side edge of the board member, each said engagement element being in the form of a roller and engageable with a wall rail;
   a connecting element for connecting said first engagement element and the board member to one another, said connecting element including a pivot spindle, the connecting element, following disengagement of said second engagement element from the wall rail, enabling pivotable movement of the second engagement element and the board member about the pivot spindle through about 180° into a second position;
   said second engagement element being engageable with the wall rail in the second position of the board member.

2. The board according to claim 1 including a second connector element for connecting said second engagement element to the board member, said second connecting element including a second pivot spindle such that, upon disengagement of said first and second engagement element from the wall rail, said first engagement element and said board member are pivotable about said second spindle.

3. The board according to claim 2 wherein the board member is configured without fixtures such that said board member is pivotable in a number of steps in the same direction through 180° about each of the pivot spindles.

4. The board according to claim 1 wherein said board member is pivotable through at least 180° about each of said pivot spindles.

5. The board according to claim 1 including a rod connected to one of the first and second engagement elements and spaced laterally of the board member a predetermined distance from an adjacent border of the board member, the pivot spindle running axially through said rod.

6. The board according to claim 5 wherein said distance is dimensioned such that during a pivoting movement of the board member about the pivot spindle, said first engagement element is pivotable relative to said board member.

7. The board according to claim 1 wherein said first engagement element is located on said board member a predetermined distance beneath a top border of the board member.

8. The board according to claim 1 wherein said first engagement element is located relative to the board member above a top border of the board member.

* * * * *